Dec. 3, 1929. C. H. ARNOLD 1,737,907
CLUTCH MECHANISM
Filed March 26, 1926 2 Sheets-Sheet 1
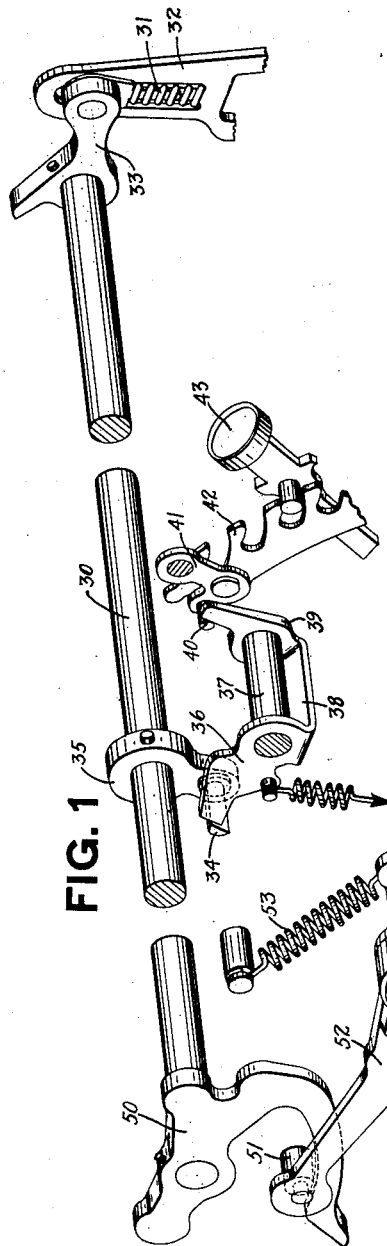
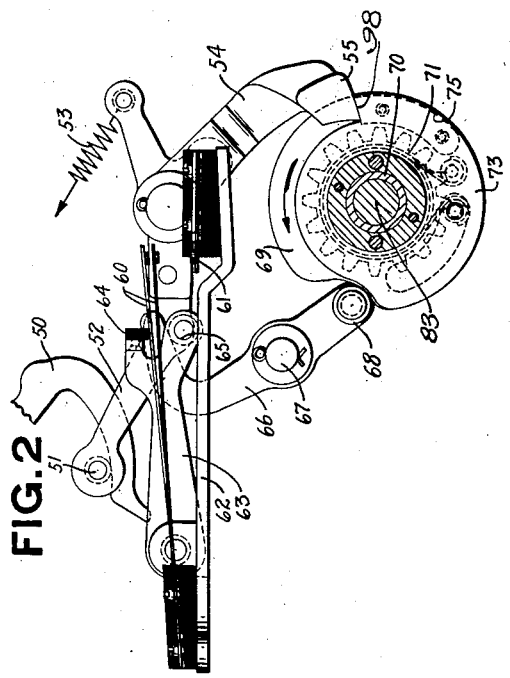
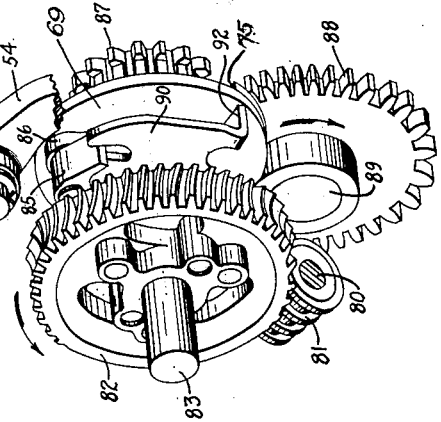
Inventor
Charles H. Arnold
By Karl Beust
Henry C. Stauffer
His Attorneys Dec. 3, 1929.  C. H. ARNOLD  1,737,907
CLUTCH MECHANISM
Filed March 26, 1926  2 Sheets-Sheet 2

Inventor
Charles H. Arnold
By Pearl Beust
Henry E. Stauffer
His Attorneys

Patented Dec. 3, 1929

1,737,907

UNITED STATES PATENT OFFICE

CHARLES H. ARNOLD, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND

CLUTCH MECHANISM

Application filed March 26, 1926. Serial No. 97,668.

This invention relates to clutch mechanism and more particularly to clutches adapted for use with cash registers and like machines. A preferred form of this invention is shown applied to a machine of the type shown and described in a patent to F. L. Fuller, No. 1,394,256. The clutch itself is of the general type shown and described in the patents to C. F. Kettering No. 923,857 and to Kettering and Chryst, No. 1,144,418.

One object of the present invention is to provide machines of the type noted above with an improved form of clutch mechanism.

Another object is to construct a clutch device which will be positive in operation, and which will not slip.

With these and incidental objects in view, the invention includes certain novel features of construction and combinations of parts, the essential elements of which are set forth in appended claims, and a preferred form or embodiment of which is hereinafter specifically described with reference to the drawings which accompany and form part of the application.

In the drawings:

Fig. 1 is a general perspective view of the clutch mechanism and the mechanism for rendering this mechanism effective.

Fig. 2 is a detail side elevation of the motor switch and the means for closing and opening it.

General description

Figure 3:
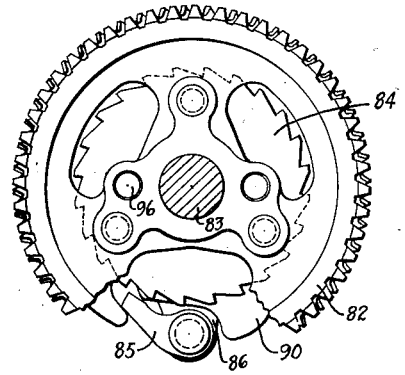
Fig. 3 is an end elevation of the clutch mechanism.

This invention discloses a new and improved form of clutch mechanism for use with cash registers. It was found that the clutches previously used, and shown in the patents above mentioned, would slip somewhat due to wear of the various parts thereof, particularly the rollers. The mechanism shown in the present application was designed, therefore, to be positive in its action and to prevent the slippage mentioned.

Release mechanism

In connection with this invention, there is shown the mechanism of the above mentioned Fuller patent for releasing the machine, throwing in the clutch and closing the motor circuit. It is to be understood, however, that the clutch mechanism of the present invention has many other applications and it is not desired to limit the invention in any manner to the mechanism shown herein.

All machines of the type shown in the Fuller patent, are provided with what is known as a release shaft which, in this case, is the shaft 30 (Fig. 1). This shaft normally tends to rock in a counter-clockwise direction due to a spring 31 which acts in a link 32 connected to a lever 33 fast on the right hand end of shaft 30. This movement of the shaft is normally prevented by the engagement of a half round stud 34 carried by an arm 35, fast on the shaft, with the end of an arm 36 loosely mounted on a shaft 37.

When it is desired to permit the shaft 30 to rock, the stop arm 36 is moved away from in front of the stud 34 on arm 35 by the following mechanism. The stop arm 36 is connected by a yoke 38 to an arm 39. The upper end of this arm contacts a pin 40 carried by an arm 41 pivoted to the frame supporting one of the banks of keys 43. At its lower end, the arm 41 supports the upper end of a detent bar 42 which cooperates with all of the keys 43 in its appropriate bank, in a manner well known in the art.

When a key 43 is depressed, the detent bar 42 will be moved downwardly. This will cause the pin 40 to rock the arm 39, yoke 38 and arm 36 to remove the end of stop arm 36 from the path of the stud 34. When this occurs, the shaft 30 will rock in a counter-clockwise direction under the influence of spring 31.

Fast on the left hand end of shaft 30 is a hooked arm 50 which cooperates with a roller 51 carried by a detent lever 52 (Figs. 1 and 2). This detent lever normally tends to rock counter-clockwise due to a spring 53 stretched between a projecting portion of the lever and a stud on the machine frame (not shown). Integral with and forming part of the detent lever 52 is an arm 54 having a forked end 55 (Figs. 2 and 5) which cooperates with various parts of the clutch mechanism to be presently described.

Motor switch mechanism

Figure 4:
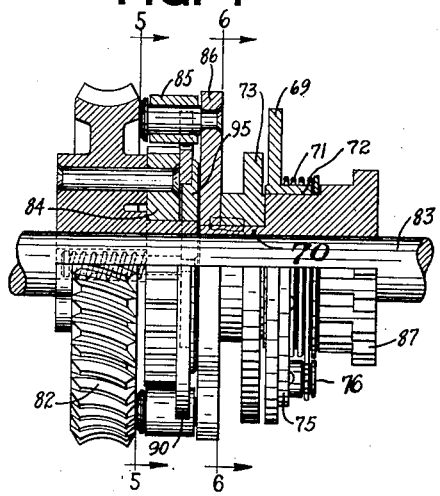
Fig. 4 is a side elevation of the clutch with a portion of the mechanism broken away.
Figure 6:
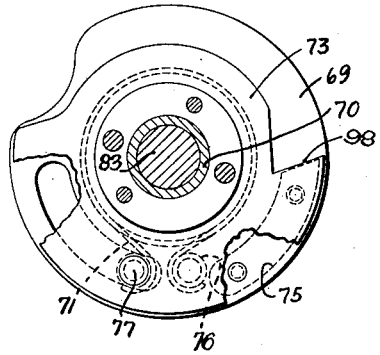
Fig. 6 is a section taken on line 6—6 of Fig. 4, looking in the direction of the arrows.
Figure 7:
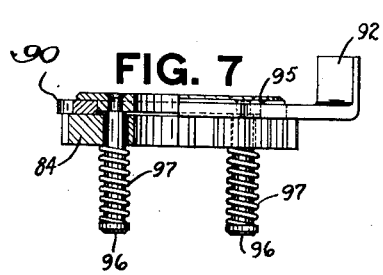
Fig. 7 is a detail side view of the means for frictionally connecting two portions of the clutch.

The motor circuit is closed, upon the depression of one of the keys 43, by means of a switch shown in Fig. 2. Supported in a block of insulating material are two spring contacts 60 adapted to cooperate with two stationary contacts 61, only one of which is shown, also supported in a block of suitable insulating material. Pivoted to an ear of a base plate 62 which carries the switch is an arm 63 which has an insulation block 64 extending across both of the spring contacts 60. The arm 63 also carries a roller 65 with which the hooked end of a switch lever 66 cooperates. The switch lever 66 is pivoted on a stud 67 projecting from the machine side frame (not shown). At its lower end the switch lever 66 carries a roller 68 which cooperates with the periphery of a cam disk 69 loose on a sleeve 70. (See also Fig. 4.) This disk normally tends to rotate in a counter-clockwise direction due to the action of a spring 71 wrapped around a hub 72 of the disk 69. One end of the spring is fastened to a stud 76 projecting from the cam disk 69 and the other end to a stud 77 carried by a companion disk 73 (Figs. 2, 4 and 6) fastened to the sleeve 70, the stud projecting through a slot in cam disk 69. The spring 71 is put under tension and held in this position (shown in Fig. 2) by the contact of one tine of the forked end 55 of detent arm 54 with an abutment 75 secured to cam disk 69.

When a key 43 is depressed, the release shaft 30 is permitted to rock counter-clockwise thereby removing the hooked portion of arm 50 from beneath the roller 51 on arm 52 of the detent lever. This arm will then rock counter-clockwise due to spring 53, a sufficient distance to remove the forked end 55 of arm 54 from its cooperative relation with the abutment 75. When this occurs, the cam disk 69 will rotate in a counter-clockwise direction to the extent of the slot therein through which the spring carrying stud 77 supported by disk 73 projects. The periphery of cam disk 69 is so formed that a high portion thereof will cooperate with roller 68 (Fig. 2) to rock the switch lever 66 clockwise. The upper hooked end of this switch lever will thereby rock the arm 63 clockwise and the insulation block 64 of this arm will move down and close the motor switch, thereby starting the motor. No motor is shown herein, as any suitable type of electric motor may be used with this invention.

Clutch mechanism

The motor drives a shaft 80 (Fig. 1) which carries a worm 81 meshing with a worm gear 82 (Figs. 1, 3 and 4) loosely mounted on a rod 83 supported by the machine side frame. Secured to the worm gear 82 is a ratchet 84 (Figs. 3, 4 and 5) with which a pair of pawls 85 is adapted to cooperate. These pawls are carried by a plate 86 fast on the end of the sleeve 70 which carries at its other end a gear 87 meshing with a gear 88 fast on a shaft 89 which is the main drive shaft of the machine. The plates 73 and 86 are secured to the sleeve 70 by any suitable fastening means such as studs, screws or the like indicated in the cross sectional view in Fig. 6. Located adjacent to the plate 86 is a control plate 90 (Figs. 1, 3, 4, 5 and 7) which has peripheral cam slots 91 cut therein cooperating with the pawls 85. It can be seen from Fig. 5 that when the control plate 90 is rotated a short distance in a counter-clockwise direction, the slots 91 will rock the pawls 85 clockwise into engagement with the ratchet 84. This will connect the motor to the main drive shaft 89. The control plate 90 is provided with two shoulders 93 which prevent disengagement of the pawls 85 from the cam slots 91.

Figure 5:
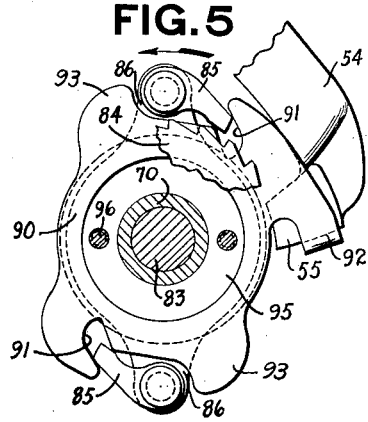
Fig. 5 is a sectional view taken on the line 5—5 of Fig. 4, looking in the direction of the arrows.

The means whereby this connection between the motor and main drive shaft is made will now be described. The control plate 90 has a projecting lip 92 which is normally in contact with the forked end 55 of the detent lever 54 and it has already been described how this lever is moved out of its detaining position on the depression of a key 43. When this occurs, the control plate 90 is free to rock counter-clockwise (Fig. 5). The control plate 90 is freely mounted on a shoulder (Figs. 4 and 7) formed on a circular plate 95 which rides on the hub of worm gear 82. Projecting laterally from the plate 95 are two studs 96 (Fig. 7) which extend into openings in the worm gear and are surrounded by coil springs 97 compressed between heads on the studs 96 and the ratchet 84. This will cause the overlapping peripheral flange of the plate 95 to bear against the control plate 90, thereby pressing this plate against the ratchet 84 and establishing a frictional connection between these parts.

It can be seen that when a key 43 is depressed, the detent arm 54 will be moved to unlocking position, the motor switch will be closed and the motor will begin to rotate the shaft 80, worm 81 and worm gear 82 in a counter-clockwise direction. The ratchet 84 is pinned to the worm gear so that it will be driven with it. The control plate 90, being connected frictionally to the ratchet 84 will also move in a counter-clockwise direction, and the cam slots 91 therein will immediately rock the pawls 85 about their pivots into engagement with the ratchet. This will connect the plate 86 with the motor and as this plate is fast with gear 87 and this gear meshes with gear 88 on drive shaft 89, the machine will be driven.

At the proper time near the end of the operation, the detent arm 54 will be moved into the path of the abutment 75 carried by cam disk 69, and also of the lip 92 of the control plate 90. When these members come into contact, the cam disk 69 will be held and the spring 71 tensioned until a shoulder 98 on companion disk 73 strikes the end 55 of the detent lever, whereupon the rotation of both these disks will cease. The stopping of cam disk 69 permits the roller 68 of switch lever 66 to cooperate with the low portion of this cam disk thereby permitting the spring contacts 60 of the motor switch to open. When the lip 92 of control plate 90 comes into contact with the end 55 of the detent lever there will be a relative movement between this control plate and the ratchet 84 which will cam the pawls 85 out of mesh with the ratchet. The driving connection between the motor and the machine will, therefore, be broken and the motor will be permitted to coast to a stop.

While the form of mechanism herein shown and described is admirably adapted to fulfill the objects primarily stated, it is to be understood that the invention is not intended to be confined to the one form herein shown and disclosed as it is susceptible of various embodiments all coming within the scope of the claims which follow.

What is claimed is:

1. In a clutch mechanism, a driving member, a ratchet fast to said driving member, a driven member adjacent to said ratchet, a pawl carried by said driven member, a control plate having a cam slot therein adapted to cause said pawl to engage said ratchet, and another plate adjacent to said control plate and adapted frictionally to connect said control plate and said ratchet.

2. In a clutch mechanism, a driving member, a ratchet fast to said driving member, a driven member adjacent to said ratchet, a pawl carried by said driven member, a control plate having a cam slot therein adapted to cause said pawl to engage said ratchet, a second plate adjacent to said control plate, and connected with the driving member, and spring means for forming a frictional contact between said second plate and said control plate whereby said control plate will be moved far enough at the beginning of an operation to cam said pawl into mesh with said ratchet in order to drive the driven member.

3. In a clutch mechanism, a driving member; a driven member; a ratchet fast to one of said members; a pawl carried by the other of said members; a control plate having a cam slot therein adapted to cause said pawl to engage and disengage relatively to said ratchet; a second plate adjacent the control plate, means acting upon the second plate to press it against the control plate and force the latter into frictional engagement with the driving member, whereby said control plate will be shifted by the driving member relatively to the driven member.

4. In a clutch mechanism, a driving member; a driven member; a ratchet fast with one of said members; a pawl carried by the other of said members; a friction plate connected with the driving member for movement towards and from the driving member; a control plate journaled for rotation relatively to the driving and driven members and to the friction plate, and located between the friction plate and the driving member, the control plate having a cam slot to cause the engagement and disengagement of the pawl relatively to the ratchet; and means to press the friction plate laterally against the control plate and force the latter into frictional contact with the driving member.

5. In a clutch mechanism, a driving member, including a ratchet, a driven member; a pawl carried thereby; a friction plate connected with the driving member for movement towards and from the driving member; a control plate journaled on the friction plate for rotation relatively to the driving and driven members; a flange on the friction plate overlapping the control plate; and means to cause the friction plate to press the control plate into frictional engagement with the driving member; the control plate having a cam slot to cause the engagement and disengagement of the pawl relatively to the ratchet.

6. In a clutch mechanism, a driving member, including a ratchet, a driven member; a pawl on the driven member, a friction plate rotatable relatively to the driven member; a control plate between the driving member and the friction plate; and studs to connect the friction plate and driving member, the studs passing through the driving member; springs on the studs to draw the friction plate towards the driving member to cause the friction plate to press the control plate against the driving member; the control plate having a slot to engage and disengage the pawl relatively to the ratchet.

In testimony whereof I affix my signature.

CHARLES H. ARNOLD.